US012301968B2

(12) United States Patent
Kraemer et al.

(10) Patent No.: US 12,301,968 B2
(45) Date of Patent: *May 13, 2025

(54) OPTICAL FILTER ASSEMBLY FOR IMAGE-CAPTURING DEVICE

(71) Applicants: Christopher Jordan Kraemer, Dallas, TX (US); Charles McClelland Marshall, Dallas, TX (US); Charles Thomas Marshall, Atherton, CA (US)

(72) Inventors: Christopher Jordan Kraemer, Dallas, TX (US); Charles McClelland Marshall, Dallas, TX (US); Charles Thomas Marshall, Atherton, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 17/453,268

(22) Filed: Nov. 2, 2021

(65) Prior Publication Data
US 2022/0303439 A1 Sep. 22, 2022

Related U.S. Application Data

(63) Continuation of application No. 16/929,687, filed on Jul. 15, 2020, now Pat. No. 11,172,106, which is a
(Continued)

(51) Int. Cl.
H04N 23/55 (2023.01)
G02B 5/20 (2006.01)
G02B 27/09 (2006.01)

(52) U.S. Cl.
CPC .............. H04N 23/55 (2023.01); G02B 5/20 (2013.01); G02B 27/0972 (2013.01)

(58) Field of Classification Search
None
See application file for complete search history.

(56) References Cited

U.S. PATENT DOCUMENTS 3,446,125 A 5/1969 Uhlmann
5,706,139 A 1/1998 Kelly
(Continued)

FOREIGN PATENT DOCUMENTS

WO WO-2015178867 A1 * 11/2015 ............. G02B 15/10

OTHER PUBLICATIONS

Epstein, "Cool New Accessory Completely Changes the Way Your iPhone Captures Photos," BGR, Jan. 29, 2015, 2 pages; https://bgr.com/2015/01/29/iphone-camera-accessory-trippy-clip/.
(Continued)

Primary Examiner — Paul M Berardesca
(74) Attorney, Agent, or Firm — Knobbe, Martens, Olson & Bear LLP

(57) ABSTRACT

A removably attachable optical device includes a clamp comprising an upper clamp member and a lower clamp member. When the clamp is mounted on a mobile device, the upper member extends over a device side to enable an orifice formed by the upper clamp member to be positioned over an aperture of the mobile device. An optical element housing has a portion configured to engage the an upper clamp member. A non-uniform optical element is rotatably mounted to the optical element housing. Rotation of the non-uniform optical element causes light passing through the non-uniform optical element as the non-uniform optical element is rotated to be correspondingly altered to create optical effects.

19 Claims, 6 Drawing Sheets

Related U.S. Application Data continuation of application No. 16/273,984, filed on Feb. 12, 2019, now Pat. No. 10,750,067.

(60) Provisional application No. 62/629,584, filed on Feb. 12, 2018.

(56) References Cited

U.S. PATENT DOCUMENTS

| | | | |
|---|---|---|---|
| 7,358,513 B2 | 4/2008 | Ryzi | |
| 7,458,735 B2 | 12/2008 | Souma | |
| 8,009,358 B2 | 8/2011 | Zalevsky | |
| 8,593,745 B2 | 11/2013 | O'Neill | |
| 9,036,158 B2 | 5/2015 | Pesach | |
| 9,569,683 B2 | 2/2017 | Brereton | |
| 10,750,067 B2 | 8/2020 | Kraemer | |
| 2005/0237625 A1* | 10/2005 | Wei | G03B 11/00 359/676 |
| 2013/0002939 A1* | 1/2013 | O'Neill | G02B 7/002 359/811 |
| 2015/0042877 A1 | 2/2015 | O'Neill | |
| 2015/0287175 A1* | 10/2015 | Brereton | G02B 27/4205 382/249 |
| 2017/0223099 A1 | 8/2017 | Jaiswal | |
| 2018/0210223 A1* | 7/2018 | Sharp | H04N 23/55 |
| 2019/0149717 A1 | 5/2019 | Overall | |
| 2019/0253589 A1 | 8/2019 | Kraemer | |

OTHER PUBLICATIONS

Murray, "Dallas Startup Pryzm Gets Patent on Digital Lens Technology," Dallas Innovates, Nov. 20, 2017, 4 pages; https://dallasinnovates.com/dallas-startup-pryzm-patent-new-digital-lens-technology/.

Shu, "Trippy Clip Lens Gives Your Smartphone Camera a Far-Out Feeling, No Drugs Required," Digital Trends, Jan. 27, 2015, 5 pages, https://www.digitaltrends.com/photography/trippy-clip-lens-puts-far-effect-smartphone-camera-no-drugs-required/.

Wong, Nikk, "Fractal Filters: Creative filters to enhance photography!", [Online]. [Archived Apr. 6, 2014]. Retrieved from the Internet: <URL: https://www.kickstarter.com/projects/nikkwong/fractal-filters-creative-filters-to-enhance-your-m>, (Apr. 6, 2014), 12 pages.

* cited by examiner

OPTICAL FILTER ASSEMBLY FOR IMAGE-CAPTURING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This document relates to optical filters and mounting assemblies.

Description of the Related Art

As camera technology improves and utilization of the Internet grows, more individuals than ever before are capturing and sharing photo or video content on a daily basis. Users are able to capture photo and video using devices including smartphones, DSLR cameras, drone cameras, portable handheld cameras, wearable cameras, traditional film cameras and the like. Additionally, businesses, filmmakers, musicians, social media influencers and more are using tools in order to help their photo and video content stand out from the immense quantity of image-based content available. However, such conventional tools suffer from a myriad of deficiencies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a removably attachable optical device configured to position an optical element over an aperture of a mobile device, the removably attachable optical device comprising: a clamp comprising: an upper clamp member having a first end and a second end, wherein the second end comprises a threaded orifice, and a lower clamp member having a first end and a second end, where the upper clamp member and the lower clamp member intersect at a pivot point; a tension structure configured to urge respective seconds ends of the clamp members towards each other into a closed position so that when the clamp is mounted on the mobile device: the upper member extends over a portion of a first side of the mobile device, and the lower member extends over a portion of a second side of the mobile device, to enable the upper clamp member threaded orifice to be positioned over the aperture of the mobile device; an optical element housing having a threaded portion configured to threadably engage the upper clamp member threaded orifice; a non-uniform optical element rotatably mounted to the optical element housing, wherein rotation of the non-uniform optical element causes light passing through the non-uniform optical element as the non-uniform optical element is rotated to be correspondingly altered.

An aspect of the present disclosure relates to a removably attachable optical device, the removably attachable optical device comprising: an attachment assembly configured to removably couple the removably attachable optical device to a portable communication image capture device comprising an aperture, the attachment assembly comprising: an optical element housing receiving area, the optical element housing receiving area configured to position an optical element housing over and/or around the aperture; the optical element housing, the optical element housing configured to engage the optical element housing receiving area of the attachment assembly; and a non-uniform optical element rotatably mounted using the optical element housing, wherein rotation of the non-uniform optical element causes light passing through the non-uniform optical element, as the non-uniform optical element is rotated, to be correspondingly altered.

An aspect of the present disclosure relates to a method of manufacturing a removably attachable optical device for use in modifying light to be provided to an aperture of an image capturing device, the method of manufacturing the removably attachable optical device comprising: providing an attachment assembly configured to removably couple the removably attachable optical device to an image capture device having an aperture; providing an optical element housing configured to be positioned over and/or around the aperture; and rotatably mounting a non-uniform optical element to the optical element housing, wherein rotation of the non-uniform optical element causes light passing through the non-uniform optical element as the non-uniform optical element is rotated to be correspondingly altered by the non-uniform optical element.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1:
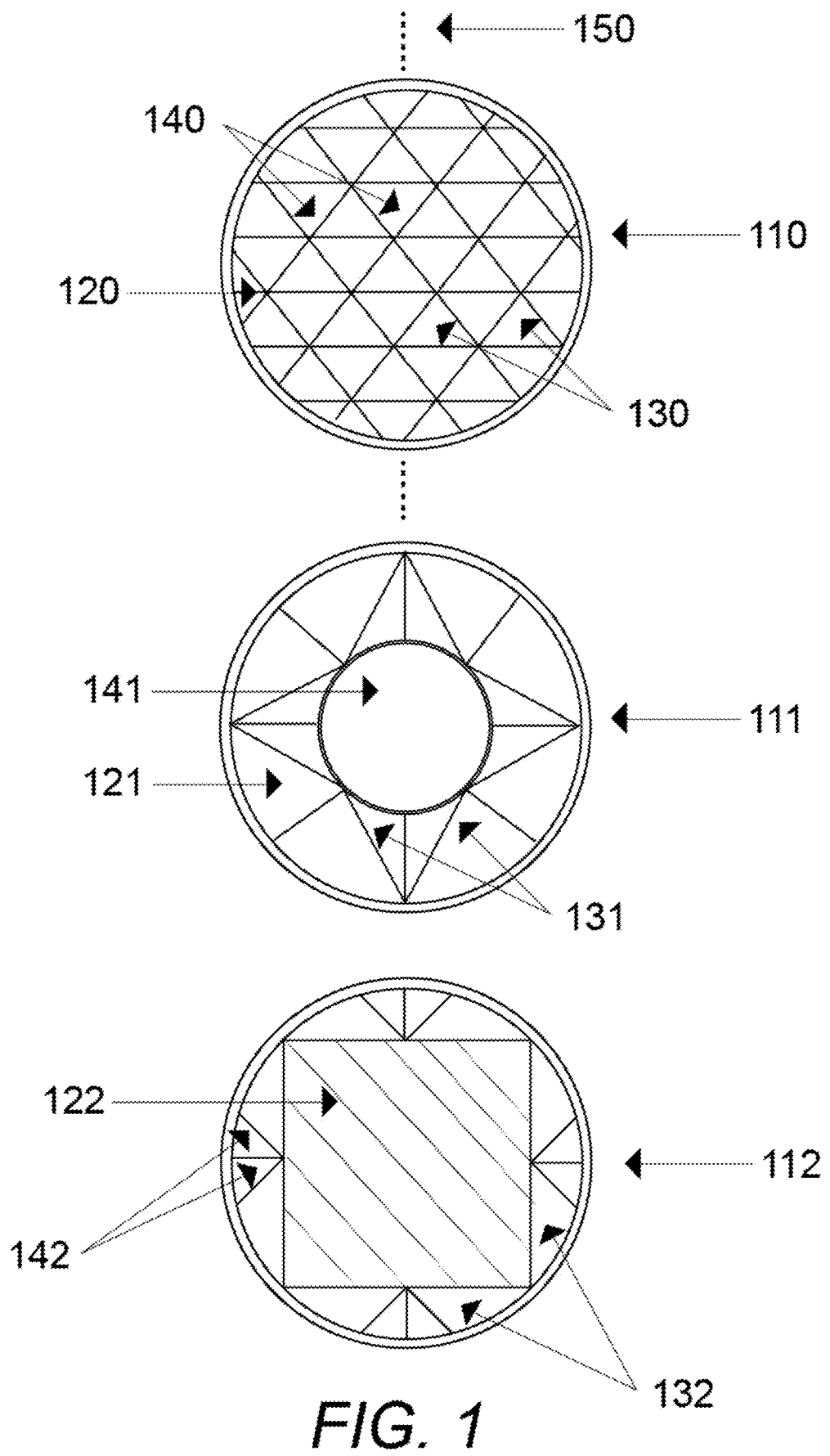
FIG. 1 is an illustration of example embodiments of non-uniform patterns within a filter apparatus that each create a unique, reflective image when paired with an image-capturing device.

The use of cameras to capture images has become ubiquitous. An issue encountered with recreational or professional photography or videography is that a user may want to create an optical effect on all or part of a photo or video the user is capturing. Conventionally, in order to enable customization of still or video images, certain software programs have been deployed that enable post-capture editing of still images and video images. Such software programs may allow users to edit images or videos and apply software created filters. In addition, certain conventional lenses have been deployed such as fisheye lenses, wide-angle lenses, macro lenses, and telephoto lens that provide corresponding optical effects. Further, relatively simple optical filters have been deployed, such as colorized filters, polarization filters, diffraction filters and the like.

However, disadvantageously, conventional software programs are often very time consuming to utilize in achieving the desired effects, as well as requiring powerful processing and substantial amounts of memory, particularly when being applied to video images. Further, the use of software programs to create optical effects is often disfavored as many photographers and videographers prefer to apply such effects before or during image capture, and prefer to do so using a physical apparatus. One reason for this preference is that working with natural light before the shot is captured typically produces a more authentic and realistic effect as compared to creating the effect in a software program after a photo or video is captured.

Still further, conventional optical filters often provide relatively simple effects and are often inadequate to achieve desired filtering.

Disclosed herein are various optical filters and other optical enhancement devices that provide certain effects and that overcome some or all of the noted deficiencies of conventional approaches. Further described herein are various methods and assemblies for mounting and/or manipulating optical filters and other optical enhancement devices. In addition, certain manufacturing processes and apparatus are described herein.

Certain aspects of the present disclosure relate to example physical optical enhancement assemblies that attach to an electronic device using various securing methods (e.g., in order to create a fractalized and/or reflective pattern on light entering an image-capturing device). Certain aspects of the present disclosure relate to example structures of enhancement assemblies as well as various methods and techniques for manufacture and use of optical enhancement assemblies.

Another issue encountered with recreational or professional photography or videography is that a user may want to create multiple effects simultaneously with respect to all or part of a photo or video the user is capturing. Some software programs also allow a user to apply multiple effects after the photo or video is captured, however, as discussed above, many photographers and videographers prefer to apply these effects before or during image capture using a physical apparatus in order to produce a more authentic and realistic appearance in the image or video they are capturing.

Further, as discussed above, conventional software programs are often very time consuming to utilize in achieving the desired effects, as well as requiring powerful processing and substantial amounts of memory.

Thus, aspects of the present disclosure relate to example assemblies that include example structures in which there are multiple optical elements present in at least the portion of an optical enhancement assembly which may be used to cover the aperture of an image-capturing device. Example embodiments of these assemblies optionally include two or more optical elements including, but not limited to, polarization filters, solid or gradient colorized filters, diffraction filters, UV filters, neutral density filters, diffusion filters, long exposure filters, 3-dimensional geometric shapes, prisms, and/or other optical elements.

Different optical enhancement assemblies disclosed herein may utilize different positioning of the optical element within the optical enhancement assembly and may utilize differently shaped assemblies and optical elements. By way of non-limiting example, optionally an optical enhancement assembly may be circular, where a first optical element forms an outer ring, while a second optical element forms an inner circle within that ring. Another example optical enhancement assembly may have a polygon shape (e.g., a square, rectangle, pentagon, etc.) where a first optical has a polygon shape (e.g., a square, rectangle, pentagon, etc.) covering a first portion of the aperture (e.g., a left half) when the assembly is mounted to the image capture device, while a second optical element may also have a polygon shape (e.g., a square, rectangle, pentagon, etc.), and covers a second portion of the aperture (e.g., a right half).

An additional issue encountered with recreational or professional photography or videography is that a user may want to create live effects on all or part of a video the user is capturing. Some software programs also allow a user to apply effects after the video is captured, however, as discussed above, many photographers and videographers prefer to apply these effects before or during image capture using a physical apparatus in order to produce a more authentic and realistic appearance in the image or video they are capturing. Further, as discussed above, conventional software programs are often very time consuming to utilize in achieving the desired effects, as well as requiring powerful processing and substantial amounts of memory.

To address the foregoing and/or other needs and to overcome the deficiencies in conventional approaches, disclosed herein are optical enhancement assemblies that include example non-uniform optical structures configured to overlay an aperture of an image capture device. For example, a non-uniform structure may include a prism or two or more unique optical elements. By way of yet further example, a non-uniform structure may include a reflective or refraction element/structure that reflects or refracts light directionally in such a way that placing the optical element over the aperture produces one image with a first set of optical effects, while rotating the optical element relative to the aperture produces a second image with different optical effects. By way of still further example, a non-uniform structure may include areas in which some of the material of the optical element is absent from the portion of the optical enhancement assembly that covers the aperture, so that the material only covers some, and not all, of the aperture. For example, with respect to the area in which the material of the optical element is absent, the area could either be filled by a non-image altering material, such as flat optical glass or plastic, or could be left open, so there is no material present between a part of the aperture and the subject of the image when capturing a photo or video. The various optical structures may be in a common plane, or have bases in a common plane.

When an optical enhancement assembly includes non-uniform optical elements, rotating the assembly's orientation relative to the aperture of an image-capturing device produces a different image than was created using the previous orientation of the assembly. Therefore, when a user captures a video through a non-uniform optical enhancement assembly attached to an image-capturing device, rotating the assembly during the video capture will produce effects that change and evolve over frames as the video is captured.

Example non-uniform assemblies may include, but are not limited to, embodiments in which the entire optical enhancement assembly rotates, embodiments in which only the portion of the optical enhancement assembly that covers the aperture of the image-capturing device rotates, embodiments in which the rotation is performed manually by the user, embodiments in which there are multiple stacked optical elements which may be separately rotated or rotated as a group of two or more optical elements, and embodiments in which the rotation is performed by an electric motor that is part of the assembly.

Example non-uniform assemblies may further include embodiments in which the rotation performed by an electric motor, where the motor is controlled by the user via a software application hosted on a user device (e.g., a paired smartphone app) configured to enable the user to control (via a graphical user interface or voice command) the speed and/or direction of the rotation, or select a preprogrammed rotational pattern. In an embodiment in which the rotation performed by the electric motor, the motor may be controlled by the user via a software application hosted on a user device (e.g., the image capture device to which the assembly is mounted), the software application may be configured to enable the user to select a range of speed settings (e.g., slow, medium, or fast, or a numerical scale such as 1-5, or via a continuous speed control) via a speed setting user interface. Optionally, the software application maybe configured to enable the user to select, via a rotation setting user interface, whether the rotation created by the motor is to be performed clockwise or counterclockwise relative to the aperture of the image-capturing device.

Optionally, the software application may be configured to enable the user to select via a tilt user interface whether the assembly is to tilt forward toward the subject of the image-capturing device, back towards the user operating the image-capturing device, to the left of the user, or to the right of the user. Optionally, the software application may be configured to enable the user to control via a user interface whether the assembly moves the optical elements away from the user and toward the subject on an axis drawn between the user and the subject of an image, or toward the user and away from the subject. Optionally, the software application may be configured to enable the user to select from one of multiple filters present in the optical enhancement assemble. For example, the optical enhancement assemble may include multiple optical filters that are mounted on a carousel or similar mechanism that enables the filters to be interchanged (e.g., by rotating the carousel) to thus enable any one of the filters to cover the aperture of the image-capturing device at given time, depending on the user filter selection.

Various aspects will now be discussed in still further detail. The following description includes, among other aspects, systems and methods for constructing a removably attachable non-uniform filter assembly designed for optical enhancement in photography and/or videography, systems and methods of affixing the assembly to an image-capturing device, as well as systems and methods of manipulating the assembly to produce optical effects that change as a result of the manipulation over a period of time.

In various example embodiments, systems and methods can be used to create and use an optical enhancement assembly. By way example, an assembly can be created by creating a 3-dimensional pattern in optical material. Optical material includes any material that is via which the wavelengths of light for which the optical material is designed may pass through. Optical material may be glass, plastic, another material suitable for the described purpose, or a combination of two or more types of materials. One such method for producing the 3-dimensional pattern in the optical material is by creating a drawing (e.g., using a CAD (Computer Aided Design) system) of a specific prismatic pattern. The prismatic pattern drawing is then used to produce a manufacturing mold. Liquid or molten optical material is then injected into the mold and allowed to harden into the 3-dimensional prismatic shape(s) configured to reflect and transmit light. The hardened material may then be removed from the mold.

Example embodiments of a prismatic shape optionally are composed of a circular or polygon shaped optical material having a repeating triangular pattern. Optionally, the angle of the outer surface of the material of some or all of the upwardly-oriented triangles is the same, relative to the y-axis of the optical material, while the angle of some or all of the downwardly-oriented triangles is about the same, but different than that of the upwardly-oriented triangles. Optionally, some of the triangles may be truncated around the perimeter of the shape, where the triangles would otherwise cross the perimeter.

The 3-dimensional prismatic filter is optionally configured to be placed over an aperture of an image-capturing device. An image-capturing device may include any apparatus capable of recording light patterns (e.g., digitally recording or recording on a film). Examples of image-capturing devices include, but are not limited to, still cameras, video cameras, and other devices that include one or more apertures configured to enable light patterns to be recorded (e.g., where the aperture may comprise a lens configured to focus light onto a solid state light sensor or film). Further examples include multipurpose devices that contain still cameras and/or video cameras such as mobile phones, smart phones, tablet computers, laptops, glasses, augmented reality headsets, desktop computers, drones, video game devices, media players, wearable or handheld cameras, watches, remote devices, and the like.

Once the non-uniform filter (or other optical enhancement mechanism) is constructed, the non-uniform filter can be affixed to at least one type of securing agent. A securing agent can include various types of materials or mechanisms, such as those described herein, configured to enable a user to affix the optical enhancement mechanism over and/or to the aperture of an image-capturing device and also enable the user to easily remove the optical enhancement mechanism from the image-capturing device.

In a non-limiting example, the securing agent may include a pressure-sensitive adhesive layer affixed to the optical enhancement mechanism (or to an optical enhancement assembly that includes the optical enhancement mechanism) and the image-capturing device may be a smartphone. A user may position the optical enhancement assembly over the camera lens (aperture) of the smartphone and apply pressure to engage the securing agent, causing the assembly to removably adhere to the smartphone. Later, when the user wishes to remove the optical enhancement assembly, the user can disengage the securing agent by peeling the assembly off of the smartphone. In other examples, the securing agent may include a clamp, a threading portion (e.g., configured to threadably engage a mating thread on or around the aperture), a slide in assembly (e.g., including one or a more of retaining rails configured to receive slide members), a snap-in assembly (e.g., a snap-in fastener configured to mate with a snap member of the optical enhancement assembly, and with a button or other control to release the optical enhancement assembly), or a magnetic assembly (configured to be magnetically couple to a ferrous material on the image-capturing device or a case thereon) to removably affix the optical enhancement assembly with the image-capturing device.

After the optical enhancement assembly is affixed to the image-capturing device, a user may initiate a recording of an image. In an example, a camera shutter for the image-capturing device opens for a user-determined length of time and light is allowed to enter the aperture of the image-capturing device. The image-capturing device can then record the light as a still image and/or a video comprising a plurality of frames. The recording operation may include saving the image and/or video to the image-capturing device's memory and/or uploading the image or video to various services, including but not limited to a cloud-based photo library, a social media network, and/or a messaging service.

Certain examples will now be discussed with reference to the figures.

With reference to FIG. 1, an assortment of example non-uniform filters are illustrated. In the illustrated examples, each filter is constructed of one or more optical materials. The illustrated example filters have a circular shape. The filters are optionally configured to be placed over the aperture of an image-capturing device via a securing agent (e.g., such as the securing agents discussed herein). While certain examples, before and hereafter, may depict certain geometric shapes, including, but not limited to circles, triangles and squares, any number of conceivable geometric shapes, and combinations thereof, may be utilized. For example, the filters may be in the form of an oval or polygon. Additionally, the securing agent itself may be configured in a shape corresponding to the shape of the filter. For example, although the securing agent may be depicted to have a circle shape, the securing agent may be configured to be one of any number of different conceivable geometric shapes including, but not limited to, a circle, triangle, square, or other shape of any number of sides, equilateral and non-equilateral.

The first example filter assembly 110 includes a repeating raised triangular pattern 120 in which the angle of the outer surface of the material within each upwardly-oriented triangle 130 is about the same, relative to the y-axis of the filter assembly 150, while the angle of each downwardly-oriented triangle 140 is about the same, but different than that of the upwardly-oriented triangles. Perimeter triangles of the pattern may be truncated due to the circular shape in which they are contained.

The second example filter assembly 111 includes an outer ring of optical material 121 with angled surfaces 131. In this example, the inner circle 141 is optionally non-light altering translucent or transparent material and features no physical material that would materially alter visible light traveling to an image-capturing device. For example, the inner circle may comprise flat optical glass or plastic. The example filter assembly 111 enables photographers and videographers to capture the primary subject of a photograph or video with clarity (via light passing through the inner circle 141), while creating reflective effects around the perimeter of an image (via light passing through the outer ring of optical material circle 121). Optionally, rather than including flat optical glass or plastic, the inner circle 141 may not include physical material, and may comprise a central hole in the assembly 111.

The third example filter assembly 112 includes a square sheet of diffraction material 122 housed in the center of the assembly 112, with the four corners extending to the perimeter of the assembly 112. The outer portions 132 of the assembly 112 are composed of a CAD-designed 3D raised prismatic element, as similarly depicted in the first filter assembly 110 with respect to angled prismatic surfaces 142. The example filter assembly 112 has a diffraction material 122 with a fractalized pattern etched into its surface. For example, the pattern may be etched using an etching chemical or a laser. The diffraction material 122 is configured to separate wavelengths of light passing through it into different colors on the color spectrum, producing a rainbow effect emanating from light sources in images captured through the diffraction material 122. In this example, the square sheet of diffraction material 122 is optionally monolithically framed within the 3D prismatic element via an injection molding process or other process. An optical enhancement assembly, such as filter assembly 112, includes multiple optical elements, and can produce multiple different types of optical effects within the same image. For example, use of the filter assembly 112 can generate a diffractive effect in the center of the image, and a reflective, prismatic effect around the perimeter of the image.

Figure 2A:
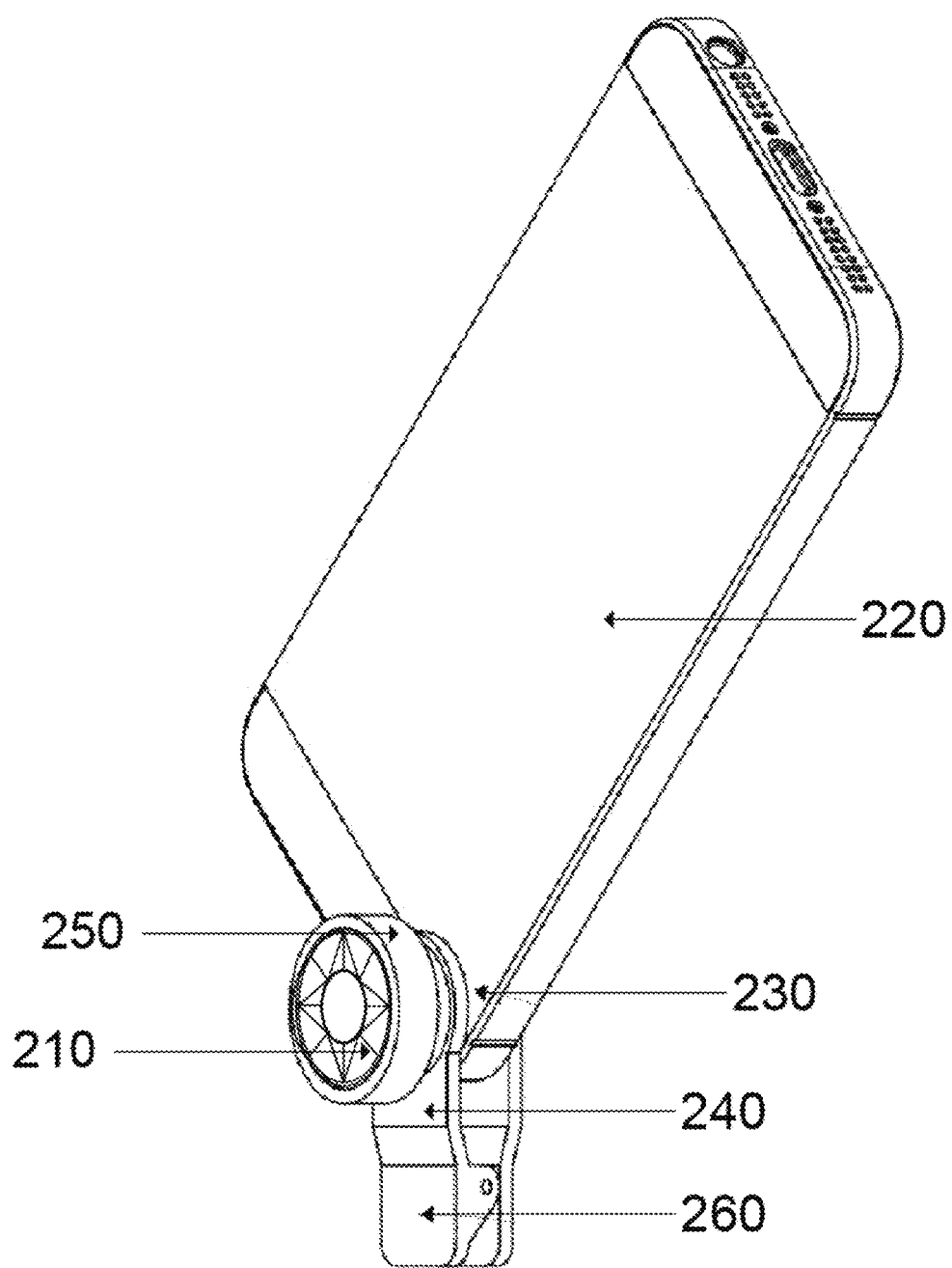
FIG. 2A is an illustration of an example embodiment of a non-uniform filter shown in FIG. 1 as a part of a removably attachable assembly for a smartphone camera or other device.

With reference to FIG. 2A, an example optical enhancement assembly 240 including a securing agent 260, is illustrated. In this example, the securing agent 260 includes a mount retaining an optically non-uniform circular filter assembly 210. The filter assembly 210 could be any of those illustrated in FIG. 1A, or can be a different filter assembly. Optionally, the filter assembly 210 may include two or more stacked filters. Optionally, the stacked filters may be mounted in respective rotatable housings. For example, one filter may be a diffraction filter, and positioned above (or below) the diffraction filter may be a filter comprising a pyramid structure, where either or both the diffraction filter and the pyramid structure may be rotated to produce different effects. The securing agent 260 may be mounted so as to position the filter 210 over an aperture 230 (which may include a lens) of an image-capturing device 220.

In this example, the image-capturing device 220 is a smartphone incorporating a camera having a sensor receiving light via the aperture 230 (covered by the assembly and not visible in this figure), and the securing agent 260 comprises a clamp removably attached to the smartphone device 220. For example, the clamp may be a plastic and/or metal clamp. The clamp may include an upper clamp member and a lower clamp member. The clamp members may be pivotally connected with each other (e.g., via a pin or bearings). A spring mechanism may be provided that urges respective ends of the clamp members towards each other, into a closed position, where one of the members has the filter assembly 210 mounted thereon towards a distal end of the member. The opposite ends of the clamp members may have a texture, hollows or ridges to facilitate a user's grip on each ends when compressing the opposite ends to place or remove the clamp on or from the image capturing device. When the spring-tensioned clamp is mounted on an image capturing device, one member may extend downward over a rear side of the image capturing device and a second member may extend downward over a front side of the image capturing device, and the filter 210 may thus be positioned over, and held against, the aperture 230.

While FIG. 2A depicts an optical enhancement assembly 240 configured to function with a smartphone 220 that has a single camera and lens, the enhancement assembly 240 may be configured to properly function with smartphones, or other image-capturing devices, which have two or more apertures (each of which may comprise one or more lenses) and two or more camera sensors. Additionally, while the illustrated example depicts an optical enhancement assembly 240 configured to function with a smartphone 220 having a single circular aperture 230, the enhancement assembly 240 may optionally be configured and sized to function with apertures and/or lenses and/or cameras of other shapes, sizes, and quantities. For example, if the image-capturing device includes two adjacent cameras, placed on above the other, or placed side by side, the optical enhancement assembly may include a filter assembly 210 sufficiently large and of appropriate shape (e.g., a rectangle, oval or capsule shape) to cover the apertures of both cameras. Optionally, the enhancement assembly may include multiple filters, wherein a given filter is sized and positioned so as to cover a corresponding aperture of the image-capturing device.

The optical enhancement assembly 240 may also be configured to reduce and/or eliminate the effect of the image-capturing devices native flash and/or a flash or other illumination device included in the optical enhancement assembly 240. For example, the optical enhancement assembly 240 may include embedded light sources which can be manually activated by the user and/or activated automatically in order to alter the appearance of the image or video being captured by the image capturing device 220. Optionally, the light sources are separately located from the primary structure of the optical enhancement assembly 240 but still comprise a part of the optical enhancement assembly 240 and are controllable by the user. Optionally, the light sources may be multi-color (to enable the light colors to be dynamically changed or changed via a programmed schedule). Optionally, the light sources may be strobed. Optionally, the light sources may be affixed to remote control or autonomous vehicles, such as small flying drones. Optionally, the position of drones, the light intensity of the light sources, the strobe frequency of the light sources, and/or the color of the light sources, is controllable by the user via an application installed on a user device or via a dedicated controls (e.g., a remote control unit).

In this example, the optical enhancement assembly 240 includes the circular non-uniform filter 210 secured within a circular plastic housing 250. This circular plastic housing 250 includes a threaded portion that enables the housing 250 to screw into threading on the clamp mechanism 260. For example, the threading of the clamp mechanism 260 may be formed in the sidewalls of an orifice configured to be placed over the image capturing device aperture so that the filter 210 has a light path to the orifice and aperture. Optionally, instead of or in addition to utilizing threads to retain the optical enhancement assembly 240, a slide-in assembly (e.g., including one or a more of retaining rails configured to mate with slide members) or a snap-in assembly (e.g., configured to mate with a snap member, and with a button or other control to release the optical enhancement assembly) may be utilized. The orifice and/or the filter may be sized to be larger than the aperture. The clamp mechanism 260 acts as a securing agent for removably affixing the clamp optical enhancement assembly 240 over the aperture 230 of the image-capturing device 220. Optionally, the filter 210 may be rotated within the circular plastic housing 250. Optionally, a ratchet (e.g., a ratchet spring and ball bearing mounted on the spring) may be provided so that the filter 210 may be rotated in precise increments (e.g., 30, 60, 90, or 120 increments). Optionally, the housing 250 may include a top portion (in which the filter is mounted) and a bottom portion. Optionally, the top portion may be rotatably coupled to the bottom portion.

The clamp mechanism 260 can be compressed to enable the optical enhancement assembly 240 to cover the aperture 230 of the image-capturing device 220, and released to affix the clamp optical enhancement assembly 240 to the image-capturing device 220. The optical enhancement assembly 240 can be similarly detached from the image-capturing device 220 by compressing the clamping portion 260 to disengage the optical enhancement assembly 240 from the image-capturing device 220, and then removing the image-capturing device 220 from between the clamp members. The illustrated example depicts an optical enhancement assembly 240 in which the circular non-uniform filter 210 is secured between two small circular plastic shelves on the interior of the circular plastic housing 250. Alternative embodiments optionally include a filter 210 which is secured within and/or to the housing 250 via one or more securing techniques, including, but not limited to, magnets, a binding agent such as glue, a seal, screws, pegs, a snapping system and other securing mechanisms.

Figure 2B:
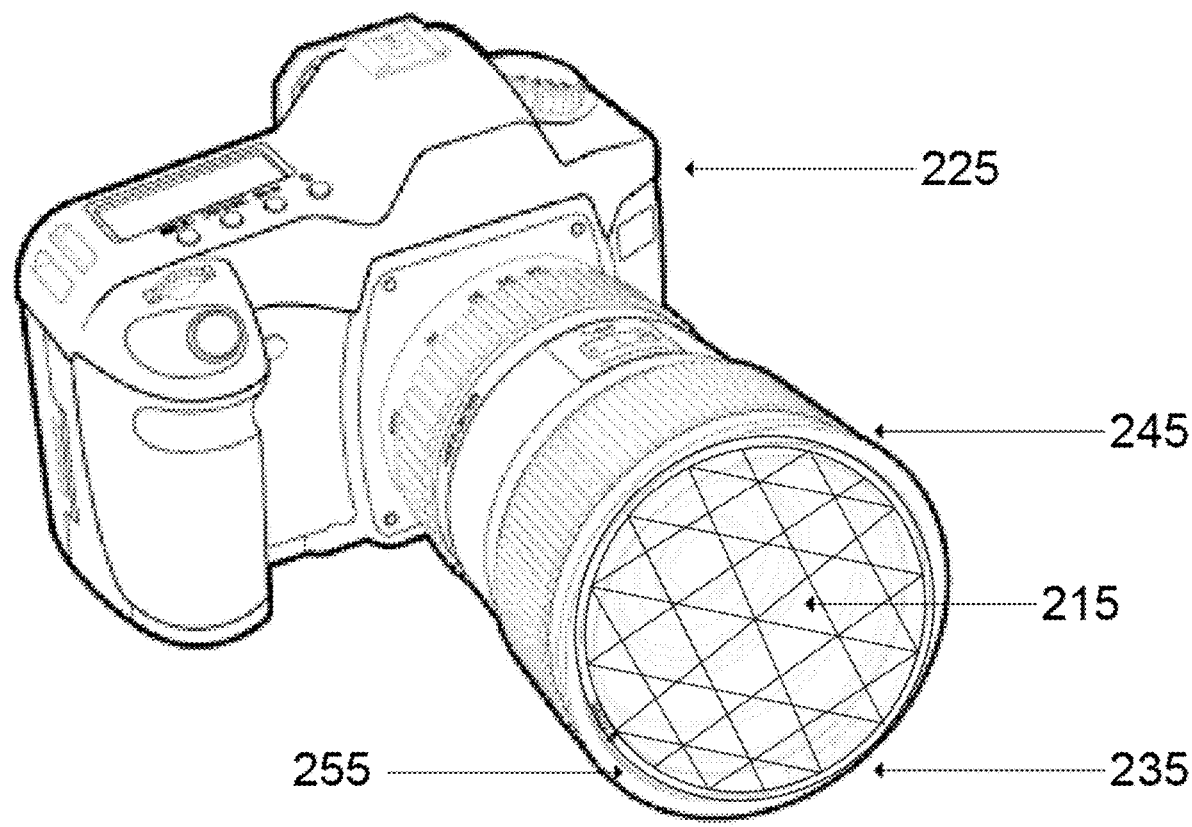
FIG. 2B is an illustration of an example embodiment of a non-uniform filter shown in FIG. 1 as a part of a removably attachable assembly for a camera lens or other lens configured to receive a filter.

With reference to FIG. 2B, an example optical enhancement assembly 240 including a circular filter 215 is illustrated. The filter 215 could be any of those illustrated in FIG. 1A, or can be a different filter assembly The filter 215 may be placed over an aperture 235 of an image-capturing device 225 via a securing agent 245. In this example the image-capturing device is a dedicated camera 225 (e.g., a DSLR (Digital single-lens reflex) camera or mirrorless camera) with an aperture 235 (covered by the assembly and not illustrated). The securing agent 245 includes a threaded assembly in the material 255 housing the circular filter 215. The threaded assembly may be removably screwed into matching threads of the camera lens housing (which may be a fixed or removable lens). The circular filter 215 may be configured to be rotatable within the securing agent 245.

Optionally, the filter 215 is not secured to the image capturing device 225. Instead, the filter may be configured to be held by the user (e.g., via a housing with a handle or grip area) in front of the camera aperture 235. Optionally, another apparatus, physically separate from the image-capturing device 225, may be used to hold the filter in a position in front of the aperture 235 so as to alter an image or video being captured on the device. Optionally, the filter 215 is secured to the camera 225 using other techniques, such as, but not limited to, a clamp assembly, a magnetic assembly, or a tray assembly. Optionally, an apparatus is provided which may mount multiple optical elements (e.g., a rotating carousel or multiple pivoting arms on which are mounted respective optical filters, or configured as a set of stacked filters that may be mounted in respective stacked individually rotatable housings so that all the filters are positioned over the aperture at the same time and one or more of the stacked filters may be rotated at a time, thereby providing the user with a large palette of optical effects and control of the same) that may be of different shapes and/or configured to produce different optical effects, so that they simultaneously cover the aperture 235 of the camera 225 or successively cover the aperture 235 of the camera 225. Still other mounting assemblies may be used.

Figure 3:
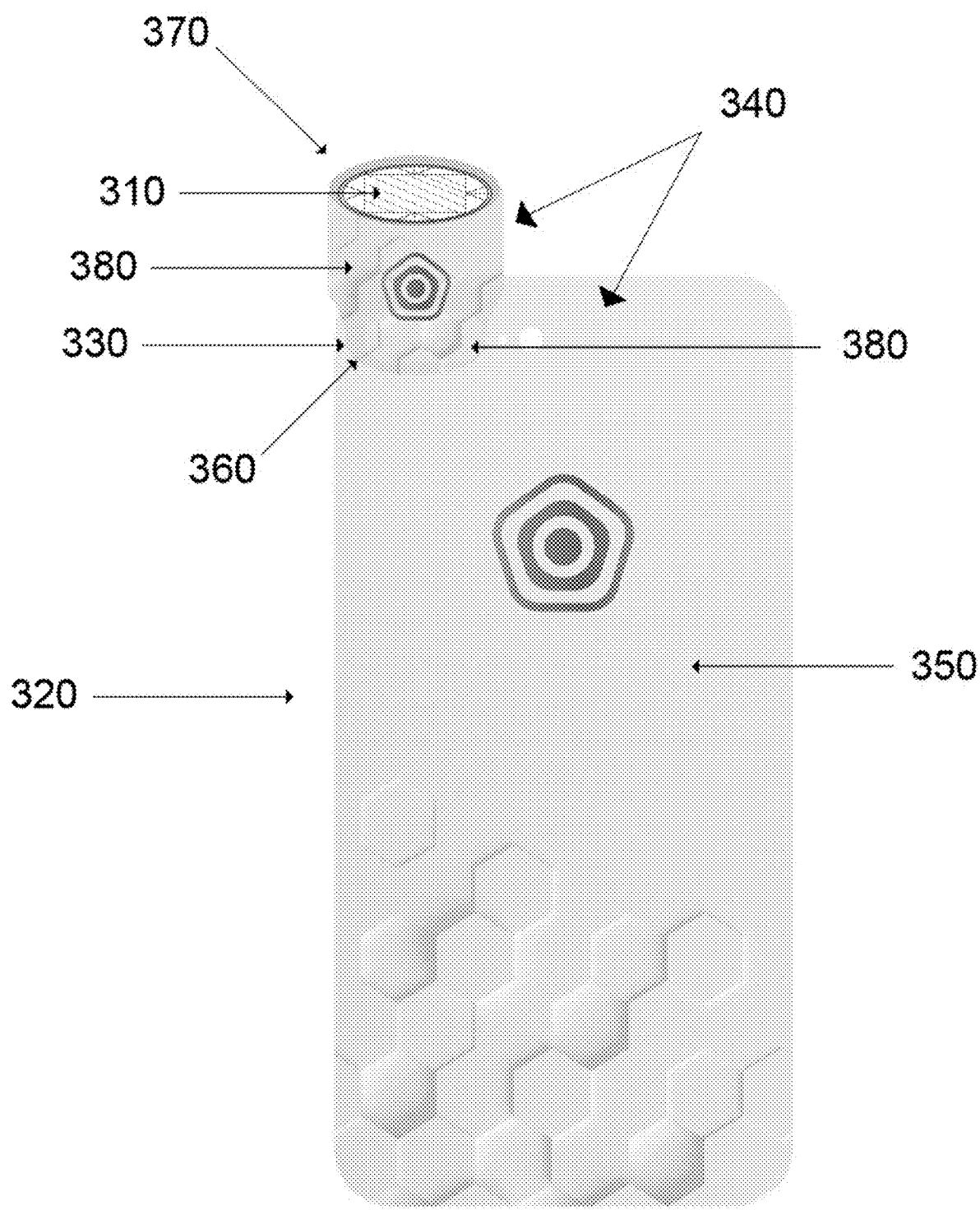
FIG. 3 is an illustration of an example embodiment of a non-uniform filter shown in FIG. 1 as a part of an alternative removably attachable assembly for a smartphone camera or other device in which the non-uniform filter is removably attachable as part of a multi-component system including a removably attachable lens filter and case for a smartphone or other device.

With reference to FIG. 3, an example assembly including a circular filter 310 is illustrated. The filter 310 could be any of those illustrated in FIG. 1A, or can be a different filter assembly. The circular filter 310 may be configured to be positioned over the aperture 330 of an image-capturing device 320 via a securing agent 340. In this example, the image-capturing device is a smartphone 320 incorporating a camera with an aperture 330 (covered by the assembly, not illustrated). In addition, in this example, the securing agent 340 is a multi-part system, including an image-capturing device case (e.g. a smartphone case) 350 with a magnetic ring 360 (covered by assembly and not illustrated) on the exterior or interior of the case 350. A filter assembly 370, (e.g., including a circular prismatic filter with diffraction 310) is secured within a circular housing 380 having a magnetic ring 360 positioned on the bottom of the housing 380. The circular housing 380 is optionally composed of one or more of a number of materials, including, but not limited to, plastics, metals, carbon fiber, rubber, wood, and/or other materials. The magnetic ring positioned on or within the housing 380 and the magnetic ring 360 positioned on or within the case 360 are affixed in such a way that the magnetic fields of each will cause the filter assembly 370 (e.g., including one or more of the filters disclosed herein, such as those illustrated in FIG. 1) to firmly secure to the case 350 when the filter assembly 370 is placed directly over the magnetic ring on the case 360. Optionally, the magnets are placed within and/or on the housing 380 and case 350, or similar components of the securing agent 340, to secure the components in their respective functional locations.

Other attachment apparatus may be utilized. For example, a rotatable threaded attachment mechanism may be provided to affix the filter assembly 370 the case 350, similar to the apparatus depicted in FIG. 2A by which the circular plastic housing 250 is able to screw into the clamping portion 260. Optionally, instead of or in addition to utilizing threads or magnets to retain the filter assembly 370, a slide-in assembly (e.g., including a one or more of retaining rails) or a snap-in assembly (e.g., with a button or other control to release the optical enhancement assembly) may be utilized.

Figure 4:
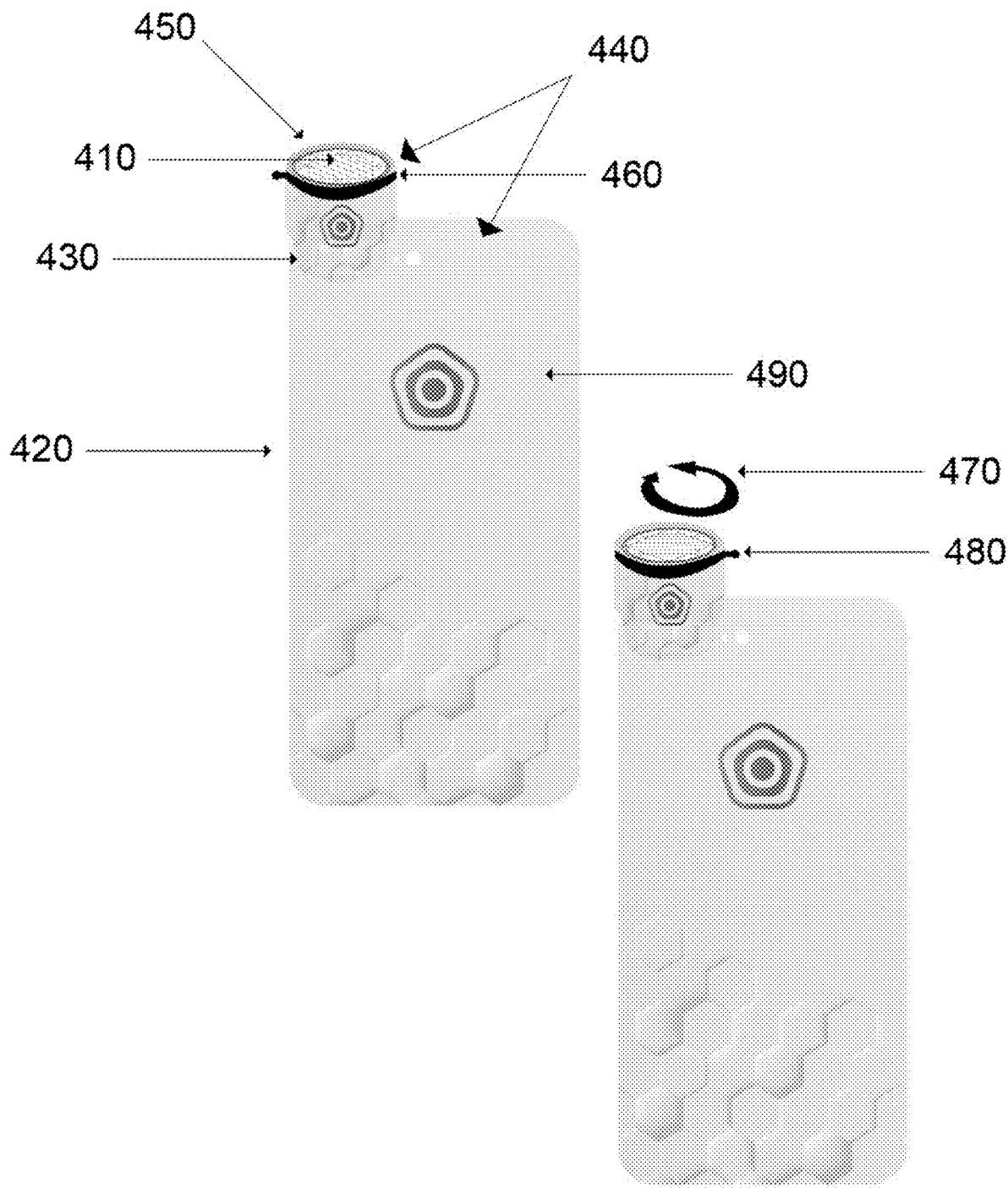
FIG. 4 is an illustration of an example embodiment of a non-uniform filter shown in FIG. 1 as a part of a removably attachable assembly for a smartphone camera or other device, in which the filter assembly is attached in such a way that the filter can be manually rotated by a user in either direction with respect to the position of the camera.

With reference to FIG. 4, an example assembly, including a circular filter 410, is illustrated. The filter 410 could be any of those illustrated in FIG. 1A, or can be a different filter assembly. The circular filter 410 may be positioned over the aperture 430 (covered by assembly and not illustrated) of an image-capturing device 420 via a securing agent 440. The filter 410 may optionally be secured to the image-capturing device 420 (e.g., a smartphone) using the same or similar mechanism as depicted in FIG. 3 and described above. The depicted construction of the filter assembly 450 includes the circular filter 410 affixed to a circular cross-section of the plastic housing 460 that is connected to the filter assembly 450 such that the circular cross-section 460 is able to rotate 470 in-place freely in either direction. Optionally, a ratchet (e.g., a ratchet spring and ball bearing mounted on the spring) may be provided so that the filter assembly 450 may be rotated in precise increments (e.g., 30, 60, 90, or 120 increments).

As illustrated, a protuberance (e.g., knurl, small rod and/or spherical structure) 480 extends from or across the circular cross-section 460 so that a user can more easily rotate the circular cross-section 460 containing the circular filter 410 using their fingers. Optionally, such manual rotation is enabled by features and methods including, but not limited to, ball-bearing rotation, gearing or dial which may be spun by the user, and/or other physical features similar to the protuberance which the user can manipulate or grasp and spin in order to induce rotation of the filter 410.

Where the filter is non-uniform throughout its structure in color, shape, material and/or another defining characteristic that affects how light travels through the filter to the aperture of an image-capturing device, adding a mechanism by which the filter can rotate while filming, enables the creation of live video effects which are not possible if the non-uniform filter is fixed in one position.

As discussed above, the example illustrated in FIG. 4 enables the user to manually rotate the circular cross-section 460 containing the circular filter 410 by grasping or placing a finger on the protuberance structure 480 extending from the circular cross-section 460, and exerting force in either direction. In this example, exerting more force in one direction would cause the circular cross-section 460 containing the circular filter 410 to rotate at a faster rate, while exerting less force in either direction would cause the circular cross-section 460 containing the circular filter 410 to rotate at a slower rate. In this example, the circular cross-section 460 containing the circular filter 410, and the filter assembly 450 are made of plastic. However, optionally the circular cross-section 460 and/or filter assembly 450 are constructed of one or more of a number of different materials, including, but not limited to plastics, metals, carbon fiber, rubber, wood, and/or other materials with different weights and/or finishes. For example, low friction materials may be used that reduce friction between the circular cross-section 460 and filter assembly 450 enabling the circular cross-section 460 to rotate freely 470 at a higher rate of speed and for a longer time. By way of further example, high friction materials may be used that increase friction between the circular cross-section 460 and filter assembly 450 causing the circular cross-section 460 to rotate freely 470 at a slower rate of speed for a lesser amount of time.

Other attachment structures may be used, such as by way of non-limiting example, a configuration where the filter assembly 450 is affixed to the case 490 via a rotatable threaded attachment mechanism, similar to the assembly depicted in FIG. 2, where the circular plastic housing 250 is configured to screw into the clamping portion 260.

Other example rotation mechanisms may be utilized including, but not limited to, an alternative grasping/manipulation mechanism to the protuberance structure 480 affixed to the circular cross-section 460, an alternative rotation mechanism to the circular cross section 460. For example, the entire filter assembly 450 may be configured to rotate relative to the case 490 to which it is removably attached. Optionally, a motor is provided that enables such rotation to be machine-powered and user-controlled, instead of or in addition to being user-powered.

Figure 5:
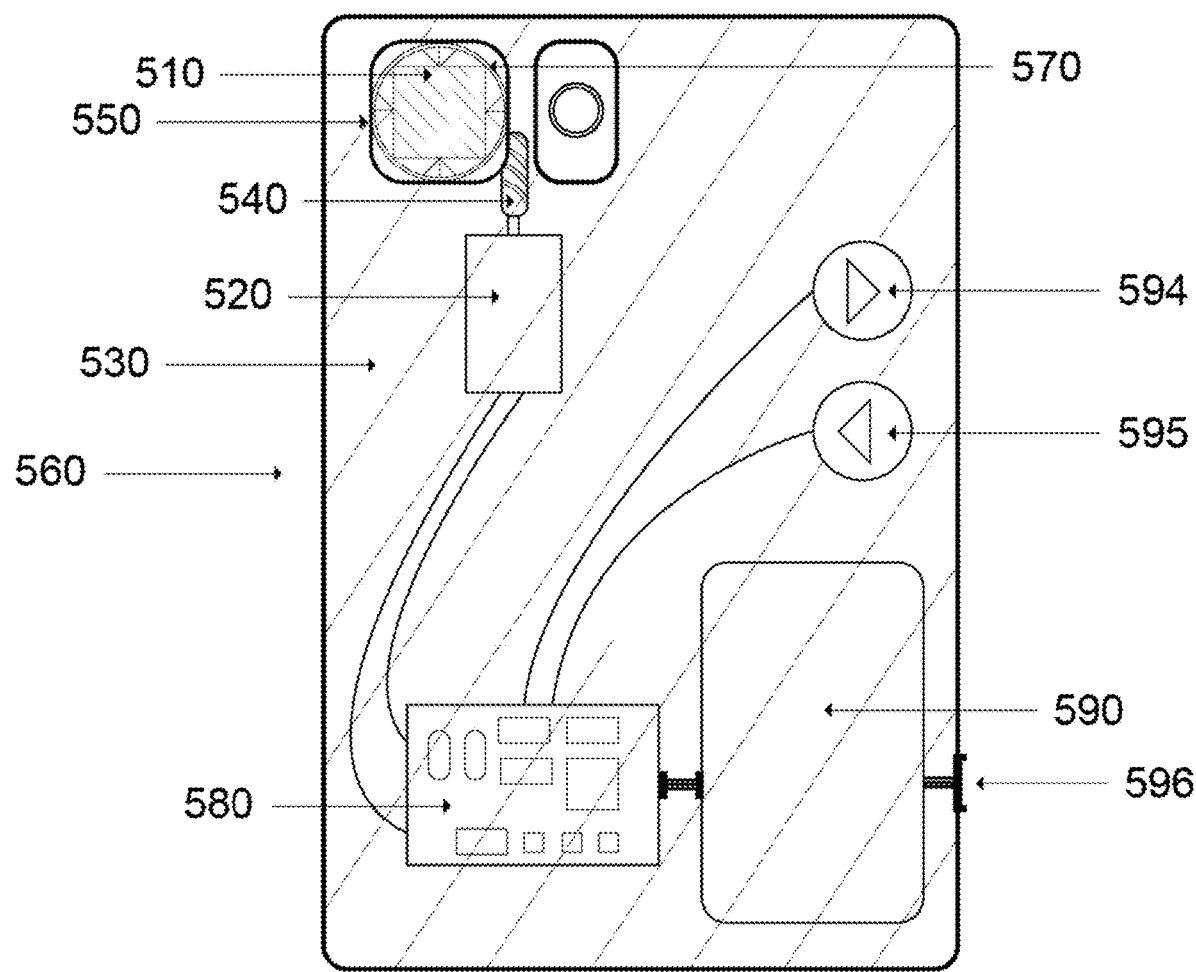
FIG. 5 is an illustration of an example embodiment of a non-uniform filter shown in FIG. 1 as a part of a removably attachable assembly for a smartphone camera or other device, in which the filter assembly is attached in such a way that the filter can rotate in either direction with respect to the position of the camera and is motivated by an electric motor housed in the assembly.

FIG. 5 depicts an example embodiment in which the rotation of a circular filter 510 is powered by an electric DC motor 520 housed within an optical enhancement assembly. In this example the optical enhancement assembly is comprised of a circular filter 510 and a device case 530 (e.g., a smartphone case) in which the circular filter 510 is fixedly housed. In this example, the DC motor 520 is placed within the device case 530 enabling the DC motor 520, with an attached helical gear 540, to power the rotation of the circular filter 510 relative to the aperture 550 (covered by circular filter 510) of the image-capturing device 560. The helical gear 540 engages corresponding gear teeth on the material 570 housing the circular filter 510.

Additionally, in this example, the DC motor 520 is connected to a control module 580 and a battery 590, each of which is also housed in the device case 530. Controls (two buttons 594, 595 embedded in the device case 530 in this example) are wired to communicate with the control module 580 to send a signal to the DC motor 520. In this example, the controls and control module 580 are configured so that pressing the first button 594 causes a corresponding signal to be transmitted to the control module 580 to rotate the circular filter 510 clockwise. Similarly, the controls and control module are configured so that pressing the second button 595 causes a corresponding signal to be transmitted to the control module 580 to rotate the circular filter 510 counterclockwise.

In this example, the battery 590 (which powers the electric DC motor 520 and is housed within the device case 530) is rechargeable via a port 596 in the device case 530. The port may be, by way of example, a Micro-USB port, a USB-C port, a Lightning port, or other port. A user may insert a mating connector, on one end of a cord, into the device case 530, and insert a connector (e.g., a USB-A connector, USB-C connector) on the other end of the cord into a mating powered connector (e.g., of an AC adapter or backup battery) in order to recharge the battery 590 in the device case 530. This assembly is optionally constructed so that any embodiment functions when paired with its corresponding image-capturing device or devices, for which it is uniquely designed, including, but not limited to, mobile phones, smart phones, tablets, laptops, glasses, augmented reality headsets, desktops, drones, wearable or handheld cameras, watches, remote devices, and the like.

Other attachment methods may be utilized with respect to the example illustrated in FIG. 5. For example, and without limitation, some or all of the components may be housed within the device case (e.g., circular lens filter 510, control module 592, battery 590, controls 594, 595, and/or port 596). Optionally, some or all of the components are housed within a removably attachable assembly similar to the clamp optical enhancement assembly 240 depicted in FIG. 2A, or similar to the threaded optical enhancement assembly depicted in FIG. 4. Optionally other non-uniform filters (e.g., filters 110, 111, 112 depicted in FIG. 1) may be employed which are optionally removable and interchangeable with other uniform or non-uniform filters or lenses.

Optionally, other motor-types may be used instead of or addition to the DC motor 520, including, but not limited to, stepper and servo motors. Using such motors optionally enables greater user control over the speed, degree, and direction of the rotation of the circular filter 510. Optionally, the control module 592 may comprise an Arduino computer module, a Raspberry Pi computer module, a Bluetooth-enabled module, or other device(s).

The control module 592 may provide user control over the speed, degree, and/or direction of the rotation of the circular filter 510. For example, the user may control the speed, degree, and direction of the rotation of the circular filter 510 via an adjustable dial on the device case 530, a slider on the device case 530, buttons, dials, and/or sliders provide by a remote device separate from the device case 530. Optionally, the remote device may be configured to communicate wirelessly by sending wired or wireless signals, including, but not limited to, RF, Bluetooth and others, to the control module 592. Optionally, a paired device app hosted on a user device (e.g., a mobile communication device) may be utilized that provides on-screen controls in which the user could select and change speed, degree, and direction of rotation of the circular filter 510, may program a custom rotation of the circular filter 510, or may select (e.g., from a menu) a pre-programmed rotation of the circular filter 510 to employ.

By way of example, where the rotation of the circular filter 510 is controllable via a device app, the device app may communicate with the control module 592 via signals from the device app received through a wireless (e.g., Bluetooth) connection between the device and the control module 592 housed within the device case 530. Optionally, instead, the control module 592 housed within the device case 530 may connect directly with the device through a data port present in the device.

Optionally, the battery 590 housed within the optical enhancement assembly is configured to charge the battery of the image-capturing device in addition to powering the motor 520 and control module 592. Optionally, a second battery is included in the optical enhancement assembly configured to charge the battery of the image-capturing device. Optionally, all or part of the optical enhancement assembly creates a waterproof seal around the image-capturing device 560. Optionally, the optical enhancement assembly is configured with an induction coil and is configured to be wirelessly charged.

Optionally, the optical enhancement assembly can wirelessly charge the image-capturing device 560. Optionally, the circular filter 510 is configured to be interchangeable with one or more of any number of compatible filters or lenses. Optionally, multiple filters and/or lenses can be positioned to simultaneously cover the aperture 550 of the image-capturing device 560. Optionally, one or more over such a stack of multiple filters and/or lenses may be configured to be separately rotatable relative to other filters and/or lenses in the stack, permitting a large palette of optical effects. Optionally, multiple filters may be provided as part of the optical enhancement assembly which can be individually positioned over the aperture 550 of the image-capturing device 560. Optionally, the optical enhancement assembly features native augmented-reality coding that optionally adds additional digital effects to images captured through the optical enhancement assembly on an image-capturing device 560.

The materials, lenses, assemblies, electronics, devices, cases, manufacturing techniques, and/or processes disclosed herein may be used in conjunction with and in combination with materials, lenses, assemblies, electronics, devices, cases, manufacturing techniques, and/or processes disclosed in U.S. Pat. No. 9,569,683, titled "Removable diffraction assembly for electronic device", the content of which is incorporated herein by reference in its entirety.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An assembly configured to position an optical element over a camera sensor, the assembly comprising:
   an optical element housing;
   an optical element configured to separate at least one wavelength of light from at least one other wavelength of light,
   the optical element, configured to separate at least one wavelength of light from at least one other wavelength of light, rotatably mounted to the optical element housing,
   a manipulation mechanism, which when manipulated, causes the optical element, configured to separate at least one wavelength of light from at least one other wavelength of light, rotatably mounted to the optical element housing to rotate within the optical element housing,
   wherein rotation of the optical element causes light passing through the optical element, to the camera sensor, to correspondingly alter the light,
      wherein the optical element comprises a diffraction optical element.

2. An assembly configured to position an optical element over a camera sensor, the assembly comprising:
   an optical element housing;
   an optical element configured to separate at least one wavelength of light from at least one other wavelength of light,
   the optical element, configured to separate at least one wavelength of light from at least one other wavelength of light, rotatably mounted to the optical element housing,
   a manipulation mechanism, which when manipulated, causes the optical element, configured to separate at least one wavelength of light from at least one other wavelength of light, rotatably mounted to the optical element housing to rotate within the optical element housing,
   wherein rotation of the optical element causes light passing through the optical element, to the camera sensor, to correspondingly alter the light,
      wherein the optical element comprises a surface with a fractalized pattern.

3. An assembly configured to position an optical element over a camera sensor, the assembly comprising:
   an optical element housing;
   an optical element configured to separate at least one wavelength of light from at least one other wavelength of light,
   the optical element, configured to separate at least one wavelength of light from at least one other wavelength of light, rotatably mounted to the optical element housing,
   a manipulation mechanism, which when manipulated, causes the optical element, configured to separate at least one wavelength of light from at least one other wavelength of light, rotatably mounted to the optical element housing to rotate within the optical element housing,
   wherein rotation of the optical element causes light passing through the optical element, to the camera sensor, to correspondingly alter the light,
      wherein the optical element comprises:
      a prismatic structure; and
      a fractalized pattern.

4. An optical device, the optical device comprising:
   an assembly configured to couple the optical device to an image capture device, the assembly comprising:
      an optical element configured to separate at least one wavelength of light from at least one other wavelength of light,
   wherein the optical element comprises a first structure and a second structure in a same plane, wherein the first structure has different optical characteristics than the second structure, wherein the optical element comprises a diffraction optical element, and
   wherein both the first structure and the second structure enable light to pass therethrough;
   and
      an optical element housing, the optical element housing configured to position the optical element, configured to separate at least one wavelength of light from at least one other wavelength of light, to enable light to pass through the optical element to an image camera sensor,
      wherein the optical element, configured to separate at least one wavelength of light from at least one other wavelength of light, is rotatably mounted using the optical element housing, wherein rotation of the optical element causes light passing through the optical element, as the optical element is rotated, to be correspondingly altered.

5. The optical device as defined in claim 4, wherein the optical element comprises two or more different structures extending from a surface of the optical element, wherein a first structure has different optical characteristics than a second structure.

6. The optical device as defined in claim 4, wherein the optical element comprises a stack of at least a first optical element and a second optical element, wherein the first optical element is rotatable relative to the second optical element.

7. The optical device as defined in claim 4, further comprising a protuberance operatively coupled to the optical element, wherein rotating the protuberance with respect to the optical element housing causes the optical element to rotate within the optical element housing.

8. An optical device, the optical device comprising:
an assembly configured to couple the optical device to an image capture device, the assembly comprising:
an optical element configured to separate at least one wavelength of light from at least one other wavelength of light; and
an optical element housing, the optical element housing configured to position the optical element, configured to separate at least one wavelength of light from at least one other wavelength of light, to enable light to pass through the optical element to an image camera sensor,
wherein the optical element, configured to separate at least one wavelength of light from at least one other wavelength of light, is rotatably mounted using the optical element housing, wherein rotation of the optical element causes light passing through the optical element, as the optical element is rotated, to be correspondingly altered; and
wherein the optical element comprises: a first structure comprising an orifice having no material therein, wherein the orifice occupies a center area of the optical element.

9. An optical device, the optical device comprising:
an assembly configured to couple the optical device to an image capture device, the assembly comprising:
an optical element configured to separate at least one wavelength of light from at least one other wavelength of light,
wherein the optical element comprises a first structure and a second structure in a same plane, wherein the first structure has different optical characteristics than the second structure, wherein the optical element comprises a surface with a fractalized pattern, and
wherein both the first structure and the second structure enable light to pass therethrough; and
an optical element housing, the optical element housing configured to position the optical element, configured to separate at least one wavelength of light from at least one other wavelength of light, to enable light to pass through the optical element to an image camera sensor,
wherein the optical element, configured to separate at least one wavelength of light from at least one other wavelength of light, is rotatably mounted using the optical element housing, wherein rotation of the optical element causes light passing through the optical element, as the optical element is rotated, to be correspondingly altered.

10. The optical device as defined in claim 4, wherein the optical element comprises a circular prismatic filter.

11. An optical device, the optical device comprising:
an assembly configured to couple the optical device to an image capture device, the assembly comprising:
an optical element configured to separate at least one wavelength of light from at least one other wavelength of light; and
an optical element housing, the optical element housing configured to position the optical element, configured to separate at least one wavelength of light from at least one other wavelength of light, to enable light to pass through the optical element to an image camera sensor,
wherein the optical element, configured to separate at least one wavelength of light from at least one other wavelength of light, is rotatably mounted using the optical element housing, wherein rotation of the optical element causes light passing through the optical element, as the optical element is rotated, to be correspondingly altered,
wherein the optical element comprises:
a prismatic structure; and
a fractalized pattern.

12. The optical device as defined in claim 4, further comprising a clamp comprising:
an upper clamp member having a first end and a second end, wherein the second end comprises an orifice, and
a lower clamp member having a first end and a second end,
where the upper clamp member and the lower clamp member meet at a pivot area; and
a tension structure configured to urge respective seconds ends of the clamp members towards each other.

13. The optical device as defined in claim 4, further comprising a motor configured to rotate the optical element in response to an activation of a rotation control.

14. A method of manufacturing an optical device for use in modifying light to be provided to a-camera sensor, the method of manufacturing the optical device comprising:
manufacturing an optical element to include a diffraction structure;
accessing the optical element, the optical element configured to separate at least one wavelength of light from at least one other wavelength of light,
wherein the optical element comprises a first structure and a second structure in a same plane, wherein the first structure has different optical characteristics than the second structure, and
wherein both the first structure and the second structure enable light to pass therethrough; and
rotatably mounting the optical element, configured to separate at least one wavelength of light from at least one other wavelength of light, to an optical element housing,
wherein rotation of the optical element causes light passing through the optical element as the optical element is rotated to be correspondingly altered by the optical element.

15. The method as defined in claim 14, the method further comprising providing a protuberance operatively coupled to the optical element, wherein rotating the protuberance about the optical element housing causes the optical element to rotate.

16. A method of manufacturing an optical device for use in modifying light to be provided to a-camera sensor, the method of manufacturing the optical device comprising:
manufacturing an optical element to form a surface with a fractalized pattern;
accessing the optical element, the optical element configured to separate at least one wavelength of light from at least one other wavelength of light, wherein the optical element comprises a first structure and a second structure in a same plane, wherein the first structure has different optical characteristics than the second structure, and wherein both the first structure and the second structure enable light to pass therethrough; and rotatably mounting the optical element, configured to separate at least one wavelength of light from at least one other wavelength of light, to an optical element housing, wherein rotation of the optical element causes light passing through the optical element as the optical element is rotated to be correspondingly altered by the optical element.

17. A method of manufacturing an optical device for use in modifying light to be provided to a-camera sensor, the method of manufacturing the optical device comprising:

accessing an optical element, the optical element configured to separate at least one wavelength of light from at least one other wavelength of light; and rotatably mounting the optical element, configured to separate at least one wavelength of light from at least one other wavelength of light, to an optical element housing, wherein rotation of the optical element causes light passing through the optical element as the optical element is rotated to be correspondingly altered by the optical element; and manufacturing the optical element to form:
a reflective area; and
a refractive area.

18. A method of manufacturing an optical device for use in modifying light to be provided to a-camera sensor, the method of manufacturing the optical device comprising:

manufacturing an optical element to form:
a prismatic structure; and
a fractalized patter;

accessing the optical element, the optical element configured to separate at least one wavelength of light from at least one other wavelength of light, wherein the optical element comprises a first structure and a second structure in a same plane, wherein the first structure has different optical characteristics than the second structure, and wherein both the first structure and the second structure enable light to pass therethrough; and rotatably mounting the optical element, configured to separate at least one wavelength of light from at least one other wavelength of light, to an optical element housing, wherein rotation of the optical element causes light passing through the optical element as the optical element is rotated to be correspondingly altered by the optical element.

19. The method as defined in claim 14, the method further comprising manufacturing optical element by:

dispensing a liquid optical material into a mold; and after the optical material has hardened, removing the hardened optical material from the mold.

\* \* \* \* \*